(No Model.) 9 Sheets—Sheet 1.
W. L. GREGG.
BRICK MACHINE.

No. 352,616. Patented Nov. 16, 1886.

Witnesses:
J. D. Massey
Wm V. Massey

Inventor:
William L. Gregg (No Model.) 9 Sheets—Sheet 2.

W. L. GREGG.
BRICK MACHINE.

No. 352,616. Patented Nov. 16, 1886.

Witnesses:
J. R. Massey
Wm. V. Massey

Inventor:
William L. Gregg (No Model.) 9 Sheets—Sheet 3.
W. L. GREGG.
BRICK MACHINE.

No. 352,616. Patented Nov. 16, 1886.

Witnesses:
J. D. Massey
Wm. V. Massey

Inventor:
William L. Gregg (No Model.)

W. L. GREGG.
BRICK MACHINE.

No. 352,616. Patented Nov. 16, 1886.

Witnesses:
J. N. Massey
Wm. V. Massey

Inventor:
William L. Gregg

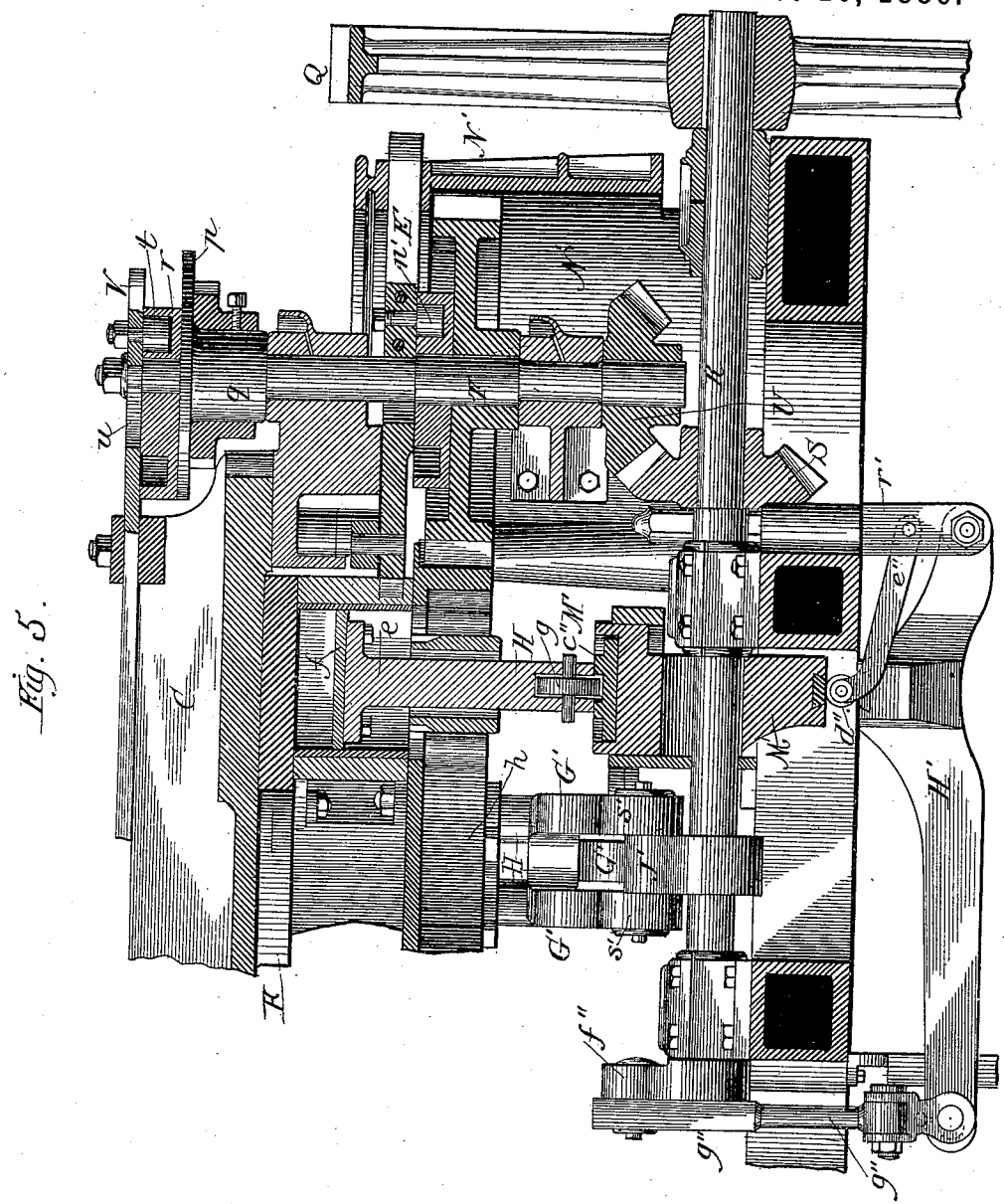

(No Model.) 9 Sheets—Sheet 6.
W. L. GREGG.
BRICK MACHINE.
No. 352,616. Patented Nov. 16, 1886.
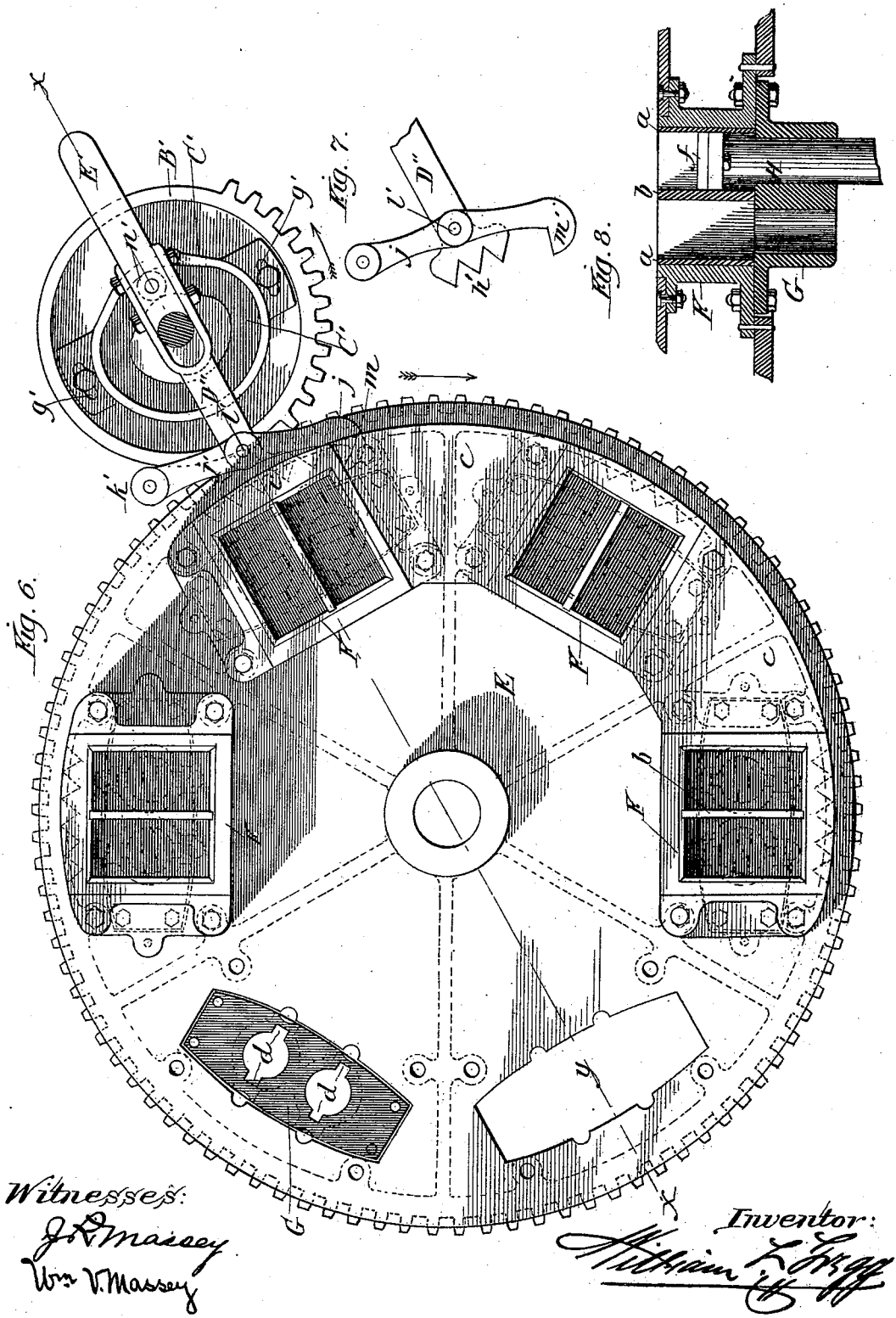

(No Model.) 9 Sheets—Sheet 7.
W. L. GREGG.
BRICK MACHINE.
No. 352,616. Patented Nov. 16, 1886.
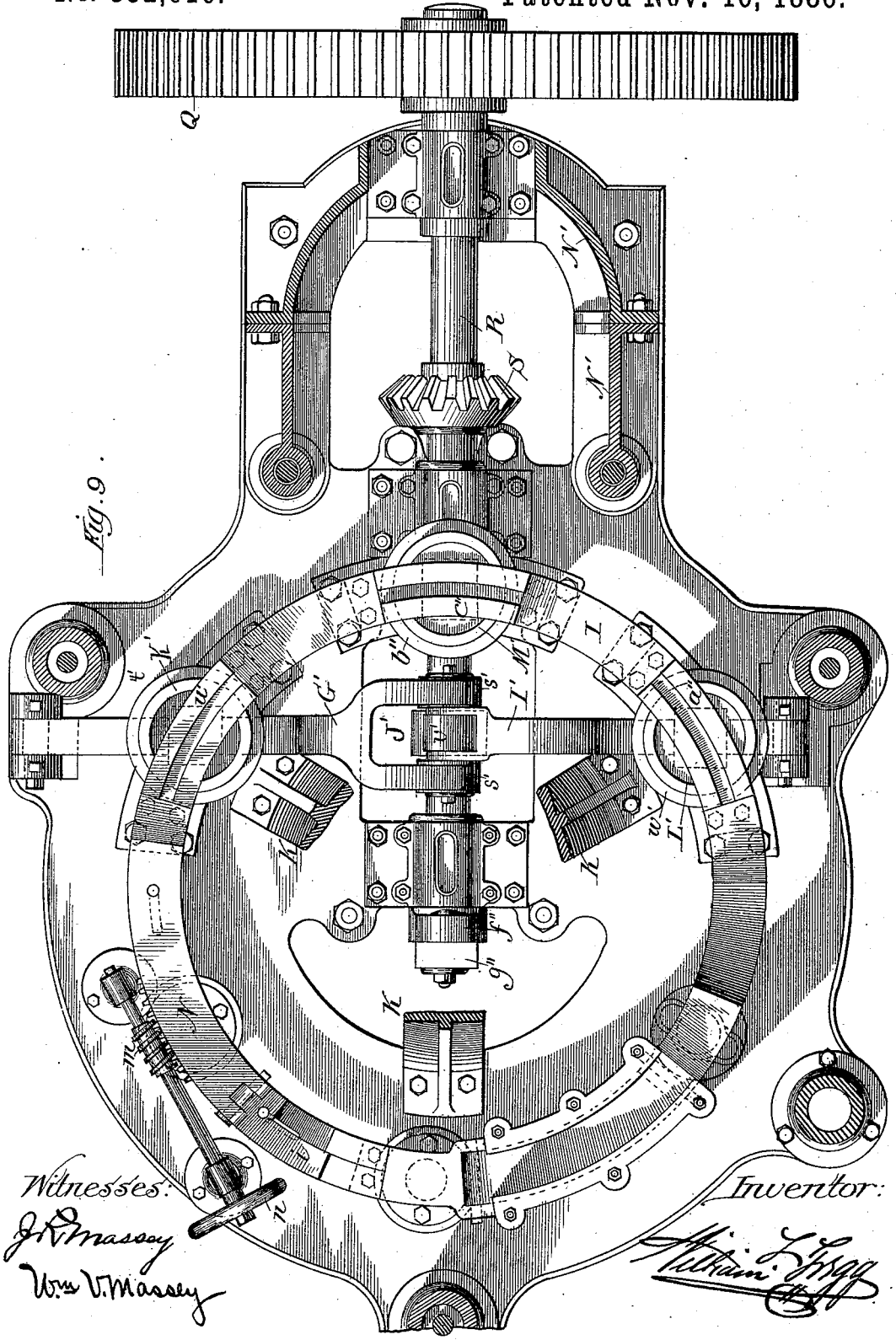
Witnesses:
J. V. Massey
Wm V. Massey
Inventor:
William L. Gregg

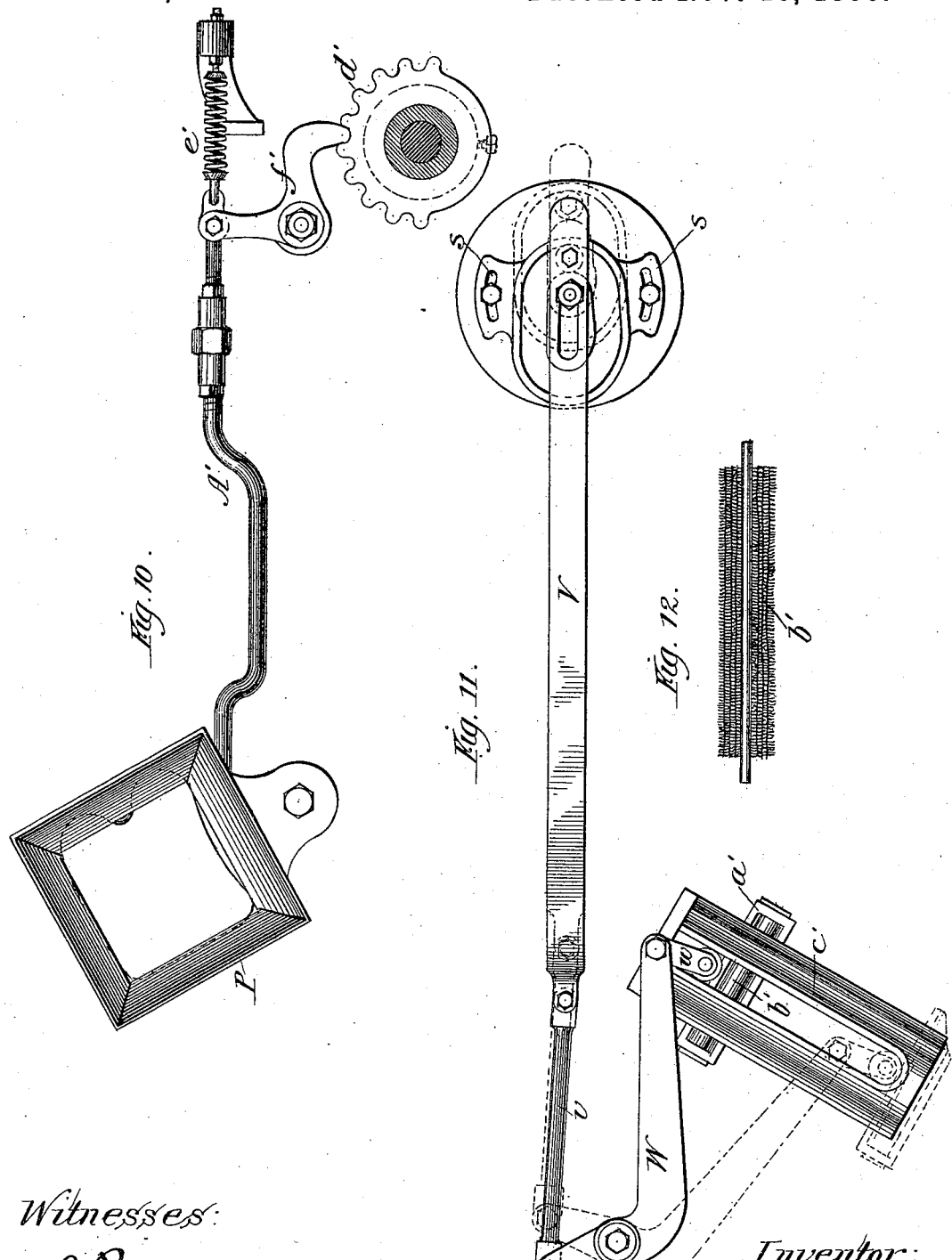

(No Model.)  W. L. GREGG.  9 Sheets—Sheet 9.
BRICK MACHINE.
No. 352,616. Patented Nov. 16, 1886.
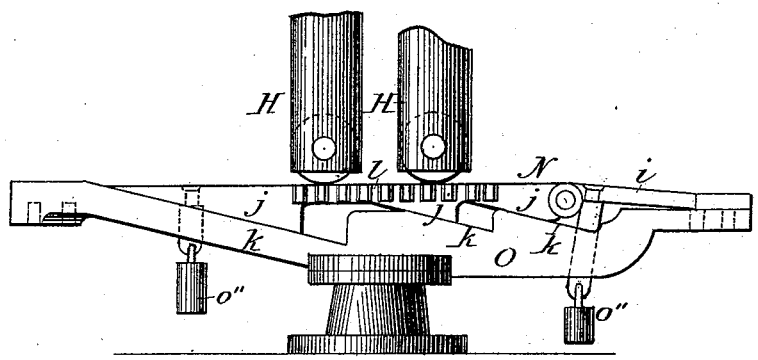
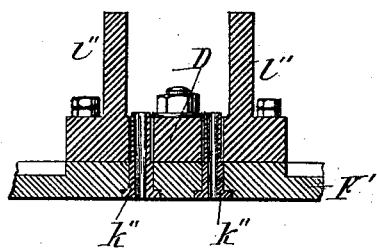
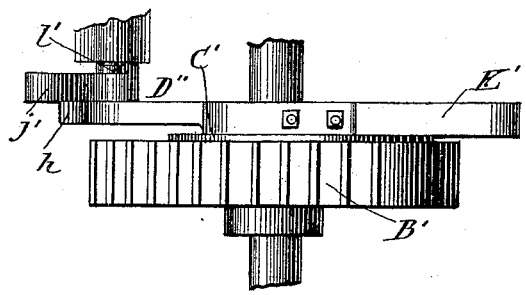
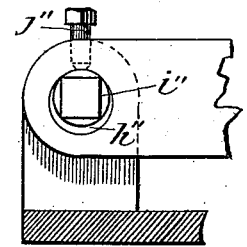
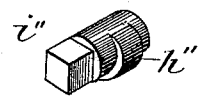
Witnesses:  Inventor:

UNITED STATES PATENT OFFICE.

WILLIAM L. GREGG, OF PHILADELPHIA, PENNSYLVANIA.

BRICK-MACHINE.

SPECIFICATION forming part of Letters Patent No. 352,616, dated November 16, 1886.

Application filed April 20, 1886. Serial No. 199,504. (No model.)

*To all whom it may concern:*

Be it known that I, WILLIAM L. GREGG, residing at Philadelphia, in the county of Philadelphia and State of Pennsylvania, and a citizen of the United States, have invented certain new and useful Improvements in Brick-Machines, of which the following is a full description, reference being had to the accompanying drawings, in which—

Figure 1:
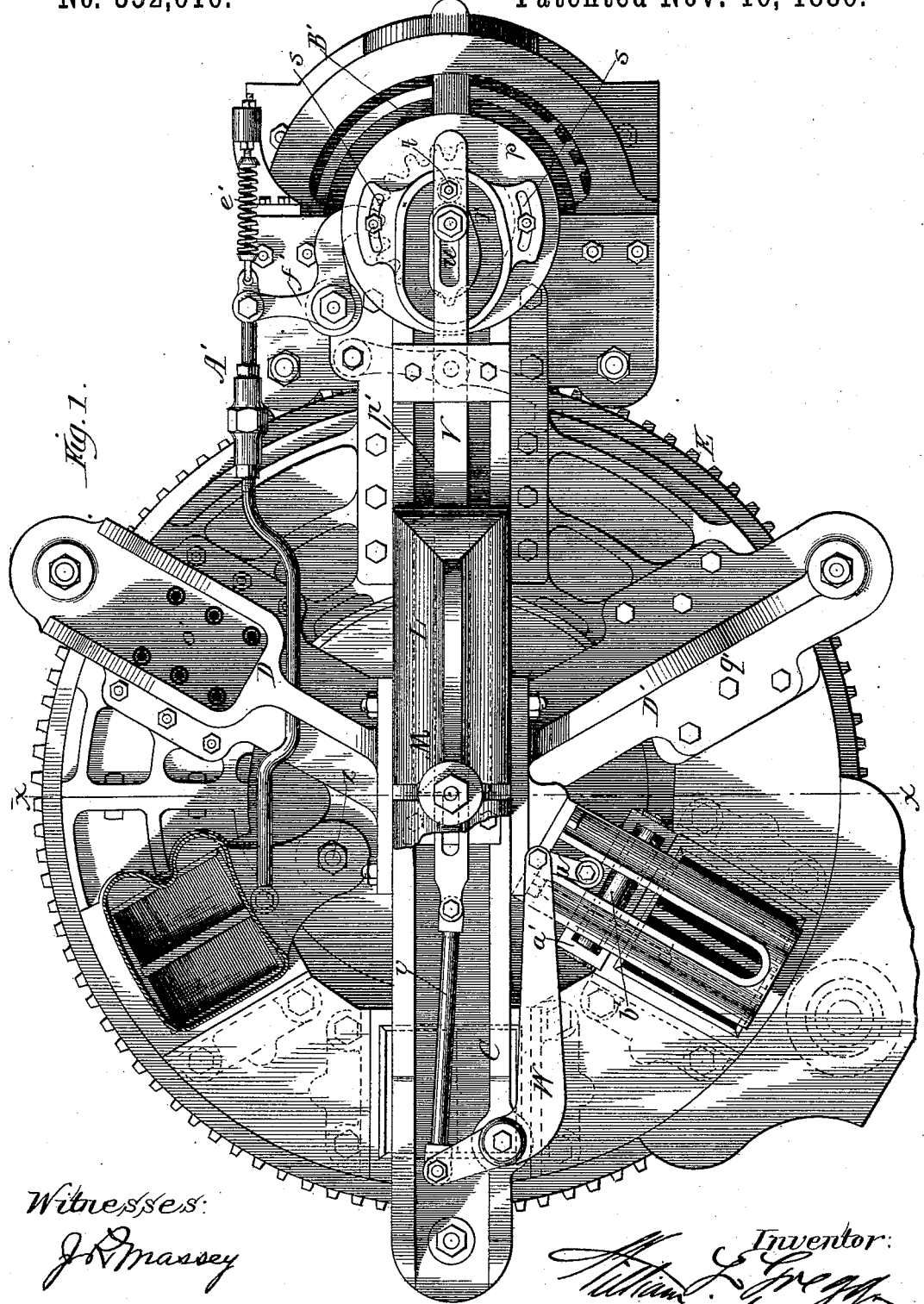
Figure 2:
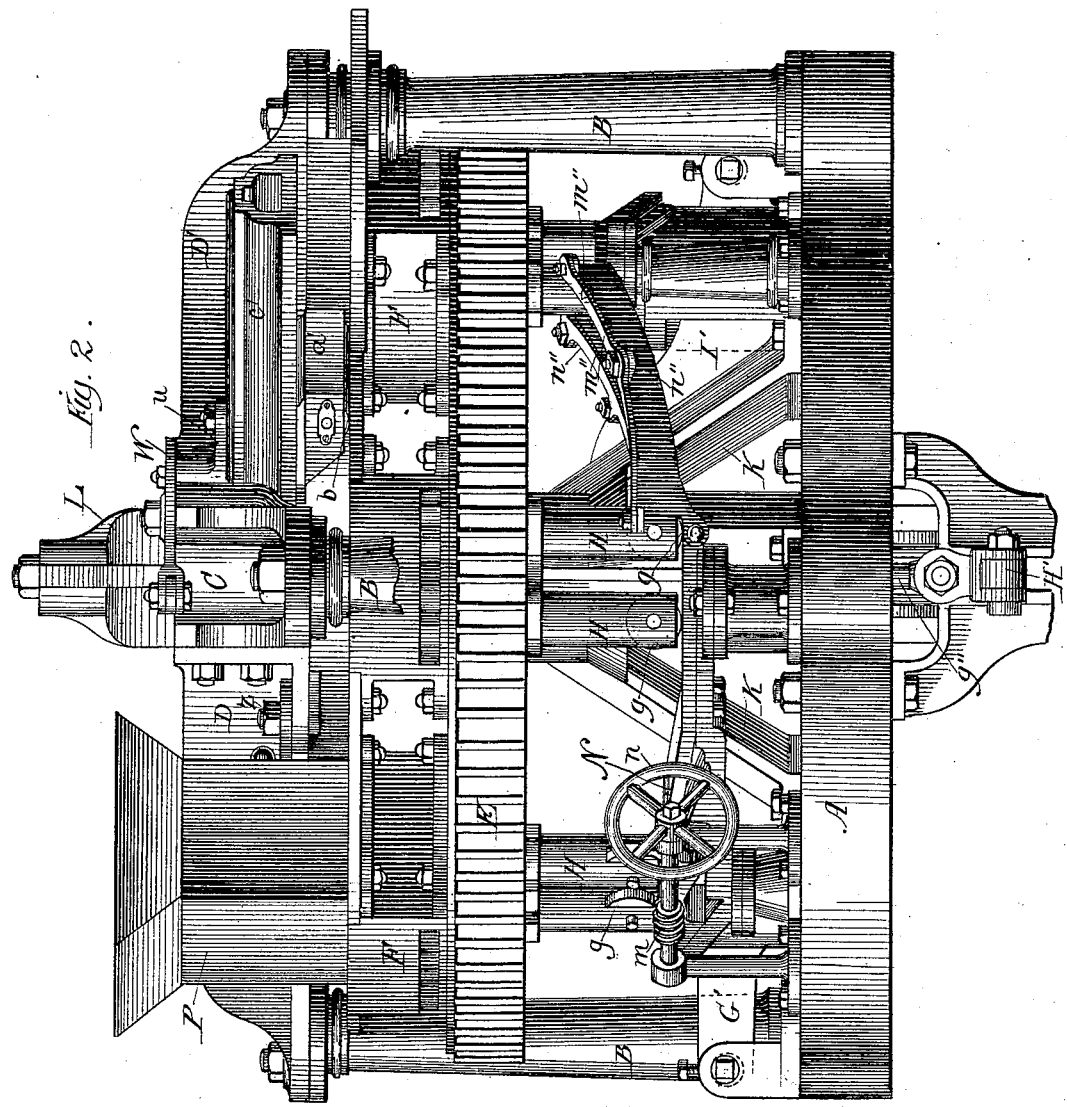
Figure 3:
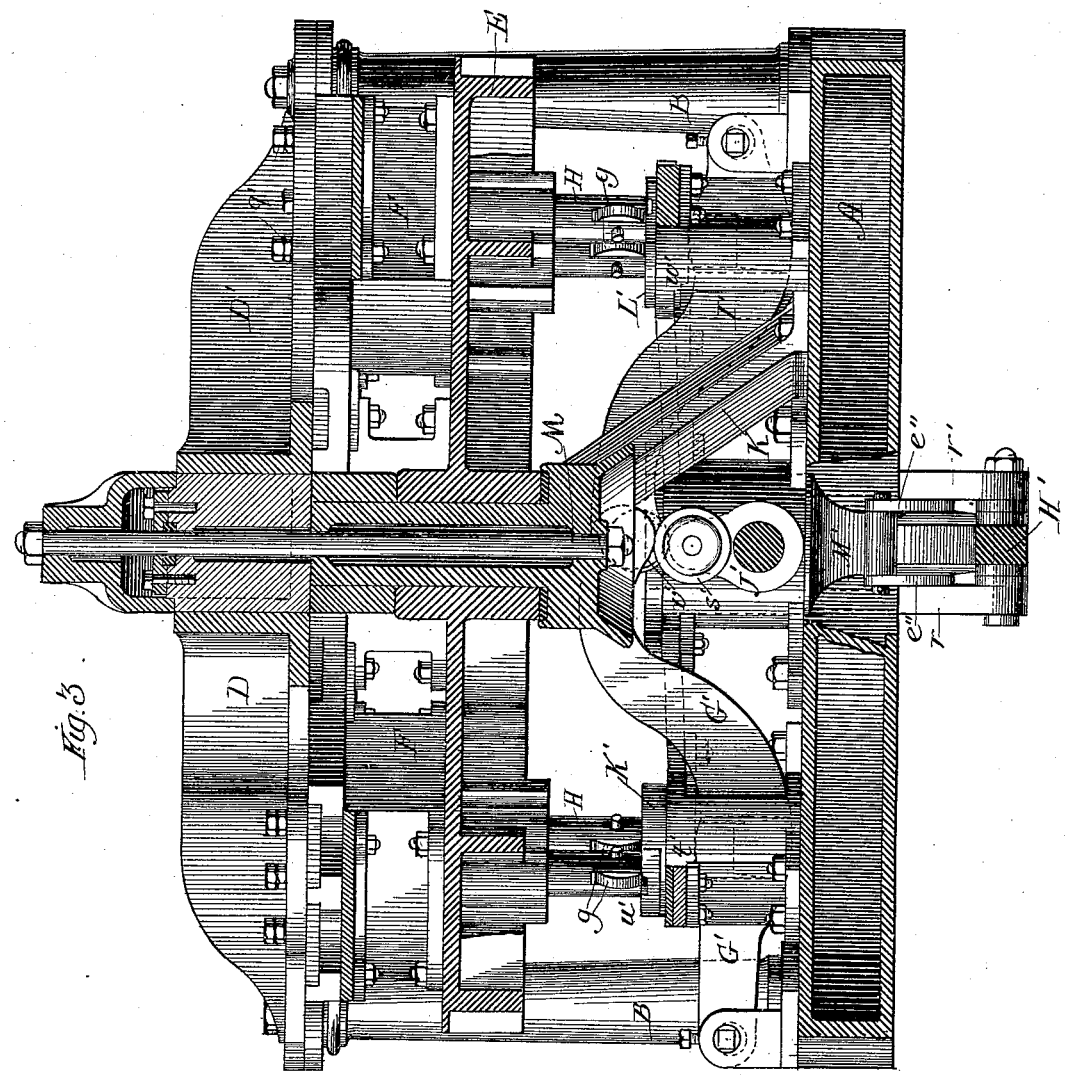
Figure 4:
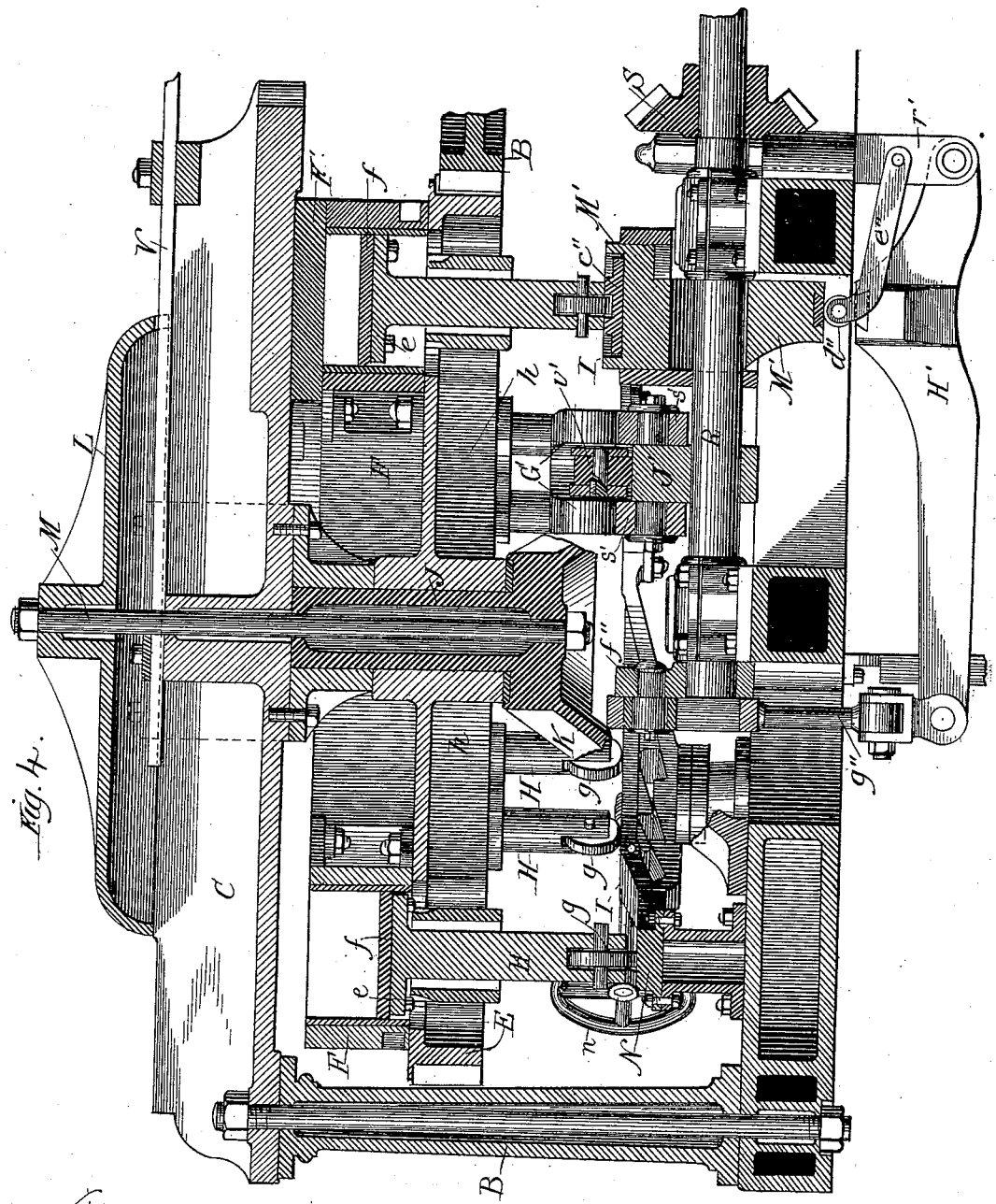

Figure 1 is a plan. Fig. 2 is an end view, looking to the right of Fig. 1. Fig. 3 is a cross-section at line $x$ of Fig. 1. Fig. 4 is a vertical longitudinal section of a part of the machine. Fig. 5 is a vertical longitudinal section of the remaining part, some parts also being shown in this figure which are shown in Fig. 4. This figure was required because a longitudinal section of the whole machine could not be shown upon a single sheet without reducing the scale. Fig. 6 is a top view of the mold table and boxes, two of the boxes being removed. Fig. 7 is a detail, being a plan of the lock and latch. Fig. 8 is a detail, being a vertical section through one of the mold-boxes. Fig. 9 is a horizontal section at line $x$ of Fig. 3, some parts above that line being shown. Fig. 10 is a detail showing a device for agitating the hopper. Fig. 11 is a detail, being a plan of the devices for removing the brick from the mold-table. Fig. 12 is an enlarged detail showing the roller-brush. Fig. 13 is a detail, being a side view, showing the movable portion of the track and its support. Fig. 14 is a detail showing the continuous tubes through which the surplus clay is discharged from the molds. Fig. 15 is a detail, being a side view of the period-gear and lock and latch. Fig. 16 is a detail showing the eccentric-pin used as a fulcrum for the pressure-levers. Fig. 17 is a detail showing one of the pressure-levers on the eccentric-pin. Figs. 13, 16, and 17 are enlarged.

My invention relates to improvements in brick-machines which are provided with an intermittently-rotating mold-table, mold-boxes, followers, and devices for moving the pressed bricks.

The leading objects of my improvements are to provide the track on which the lower ends of the stems of the followers travel with an adjustable portion to regulate the quantity of clay fed to the molds; to provide an eccentric fulcrum-pin for the levers through which the pressure is given as required for brick of different thicknesses; to provide improved devices for operating the pressure-levers; to provide removable guides for the stems of the followers; to provide an improved lock for holding the mold-table when at rest; to provide a stop to prevent the mold-table from going beyond the point where it ought to stop; to provide continuous vents for the surplus clay; to provide improved devices for removing the pressed brick from the mold-table; to provide improved means for connecting the main truss with the pivot of the mold-table and firmly hold the same while the pressure is being given, and to make other minor improvements and combinations. I attain these objects by the mechanisms illustrated in the accompanying drawings.

In the drawings, A represents the bed-plate.

B are three posts.

C is the main truss, one end of which rests upon one of the posts B and is secured by a bolt passing through the post and bed-plate.

D D' are two branch trusses bolted at one end to the main truss, and the other ends rest upon two of the posts B and are secured by bolts which pass through the posts and bed-plate.

E is a mold-table provided with gear upon the periphery, and is provided, as shown, with six mold-boxes, F, each of which, as shown, is double. The table is provided with openings, over which the mold-boxes are placed, one of which is shown at $y$. The mold-boxes are secured to the mold-table, as indicated in Fig. 8. As shown, each box is provided with a steel lining, $a$, and with a partition, $b$.

$c$ are metal plates which are bolted to the tops of the mold-boxes.

G, Fig. 8, are guides for the follower-stems, which guides are made independent and are secured to the bottoms of the mold-boxes by means of bolts. These guides are provided with recesses $d$, to permit the insertion from above of the rollers at the lower end of the follower-stems.

H are the stems of the follower. As shown, the follower consists of a head, $e$, upon the top of the stem H, to which is secured a removable plate, f. (See Fig. 8.) The lower end of each follower-stem is provided with a roller, g.

I is a track for the rollers g.

The mold-table is provided with strengthening-ribs h on the under side, and with a hub at the center, which rotates upon a pivot, J, supported by three legs, K, the lower ends of which are bolted to the bed-plate.

L is a hood on the top of the main truss, held in place by the center bolt, M, the object of the hood being in part to take a portion of the strain from the bolts which connect the branch trusses with the main truss.

I make a portion of the track upon which the rollers g travel adjustable vertically, for the purpose of regulating the amount of clay to be fed to the molds.

N, Figs. 9 and 13, represents the main part of this portion of the track. i is the other part, which is hinged to N. The under side of this part N is, as shown, provided with three inclines, j, which rest upon three corresponding inclines, k, provided in the support O. On the side of N is a rack, l, with which a worm-screw, m, engages, which worm can be operated by a hand-wheel, n. By rotating this worm-wheel the movable part N can be raised and lowered, the inclines j moving up and down on the inclines k. By raising or lowering this part N the position of the followers, when at rest in the mold-boxes, can be varied for the purpose of regulating the amount of clay to be fed to the mold-boxes. The main part of the hinged piece i is only half the width of the track, and at this point one-half of the wheels g will have a support, in whatever position the part i be placed. When the part N is at its lowest position the part i will be horizontal. As the part N is raised the part i assumes an inclined position. N is provided with a slot, o, into which passes a pin which serves as a guide.

P is a hopper pivoted to the machine at z.

Q is a gear-wheel driven by a pinion. (Not shown.)

R is the main shaft driven by the wheel Q.

S is a miter-wheel on the shaft R.

T is a vertical shaft, on the lower end of which is a miter-wheel, U, engaging with the miter-wheel S.

p is a face-plate on the top of a hub, q, which hub is keyed to the shaft T.

r is a cam, which is secured to the face-plate p by means of bolts, which pass through slots s, so that the cam can be adjusted on the plate p.

t is a roller which is secured to the sliding bar V, which bar is provided with a slot, u, through which the upper end of the shaft T passes.

v is a connecting-rod, one end of which is pivoted to one end of the bar V, and the other end is pivoted to one end of the bell-crank lever W. The other end of this lever is pivoted to a link, w, the other end of which link is pivoted to the sweep-box a', the movement of which removes the pressed brick.

b' is a roller pivoted in the sweep-box a' and covered with sheepskin or other suitable material, for the purpose of oiling the upper surfaces of the followers.

c' is a guide under which the sweep-box a' moves. The inner end of this guide is bolted to the main truss C.

d' is a mutilated pinion secured to the hub q. (See Figs. 5 and 10.)

A' is a rod connected at one end to the pivoted hopper and at the other end to a coiled spring, e'.

f' is a lever, one end of which is pivoted to the bar A', and the other end engages with the teeth of the mutilated pinion d'.

B' is a mutilated pinion engaging with the mold-table, and being so arranged that one revolution of the pinion B' gives to the mold-table one-sixth of a revolution.

C' is a cam which is bolted to this mutilated gear. The plate which carries the cam is provided with slots g', so that the cam can be adjusted on B'.

D'' is a bar forked at its outer end, and having upon its inner end, as shown, three teeth, h', which engage with notches i', of which, as shown, there are five in the side of the mold-boxes.

E' is a bar which is bolted to the fork of D'.

j' is a latch pivoted at k' to the frame and at l' to D'', which latch has a hook, m', at its free end.

n' is a roller supported on a pin which is bolted to E', the roller being arranged in the groove of the cam C', Figs. 5 and 6.

F' is a counter-pressure plate against which the brick are pressed. This plate extends from a point near the hopper around to the opposite side of the machine as far as required. The parts of this plate which are between those parts which receive the pressure are cut away somewhat, as shown in the drawings, to save metal. There are three pressure-levers, G', H', and I'. G' and I' are pivoted at their outer ends to the frame, as shown in Figs. 3 and 9. H' is pivoted to a hanger, r', Figs. 4 and 5. The lever G' is operated by a cam, J', on the shaft R, which cam has pivoted to it two rollers, s', which are arranged under and come in contact with the inner end of the lever G', which is forked, (see Figs. 5 and 9,) raising the same as the shaft R rotates, and thereby raising the pressure-block or piston K', which is located in a casing or cylinder, t', the casing and piston both being slotted for the passage of the lever G'. This casing t' is provided with flanges on opposite sides at the bottom, and also near the top. The bottom flanges are bolted to the bed-plate and the upper flanges are bolted to the track. That part of the track lettered u' is disconnected from the remaining portion, and is let into the pressure-block K', and rises and falls with it, recesses being provided in the top or upper edge of the casing t' to receive u'. The inner end of the pressure-lever I' passes into the forked end of the lever G', and is provided with a roller, v', and this lever is operated by the main body of the cam J', which comes in contact with the roller v', the other lever G' being operated, as before stated, by the same cam, J', through the rollers s'. (See Figs. 4, 5, and 9.)

w' is a casing similar to t'.

L' is a pressure-block or piston similar to K'.

a'' is a movable piece of track similar to u'.

b'' is another casing similar to t'.

M' is a pressure-block similar to K'.

c'' is a movable piece of track similar to u'.

The pressure-block M' extends down below the shaft, and is provided with a large passage through which the main shaft R passes. This pressure-block rests at its lower end on a roller, d'', in arms e'', pivoted to the hanger r', which roller rests on an upward projection from the lever H'. This lever is operated by means of a crank, f''', secured to the shaft R, and a pitman, g'''. (See Figs. 4 and 5.) The levers G' H' J' are each supported on an eccentric, h'', on a pin, i''', and by changing the position of the pin the lever can be slightly raised or lowered, and the pin i''' can be held in any desired position by a set-screw, j''', or other device.

N' is a housing which stiffens the frame and incloses the mutilated gear, and furnishes protection against injury therefrom. This housing is secured to the bed-plate and extends upward therefrom. (See Figs. 5 and 9.)

k'' are tubes secured in the pressure-plate F' and extending up through the truss D for the passage of surplus clay under the first pressure. This truss is provided with upwardly-extending projections l'', which form a partial box to receive the discharged surplus clay. (See Figs. 1 and 14.) The pins which support the rollers at the lower end of the follower-stems project a little beyond such stems, and the ends of these pins, passing under the flanges m'' on the bars n'', bring the follower-stems down upon the track after they have been raised to give pressure to the brick. The ends of the bars n'' are suitably secured in place.

In Fig. 13 I have shown weights o'', hung upon pendants from the part N, which weights may be used to aid in holding N in place.

The operation is as follows: The mold-table remains at rest a portion of the time, being driven by a mutilated pinion. When at rest, one of the mold-boxes will be beneath the hopper, and then clay will be fed to such mold-box. When the mold-table again starts, the filled mold-box will pass under the counter-pressure plate F', the surplus clay being swept off. The machinery is so timed that when the mold-box reaches the point for the first pressure at o', Fig. 1, the mold-table will stop while pressure is being given. The mold-table will then again move and will be again brought to rest, and this operation will be continuously repeated. The brick receives three pressures—one at o', one at p', and one at q'. When the machinery is fairly in operation, the pressure-levers at these three points will be operated simultaneously by the rotation of the shaft R. The first pressure at the point o' is given through the lever G', the operation of which has been before explained; but it may be further stated that by the raising of the lever G' and the pressure-block K' the follower-stems which rest upon K' will be raised with their followers, giving the brick the first pressure. The second pressure at the point p' is given through the operation of the lever H', one end of which is raised by the rotation of the shaft through the crank f''' and pitman g''', the raising of which lever also raises the pressure-block M', and with it carries up the follower-stems which are supported on M'. The third pressure is given by the lever I', which, as before stated, is operated by the rotation of the shaft R, through the cam J', acting upon the roller v' at the inner end of the lever I', the raising of which lever raises the pressure-block L'.

By means of the rack l and worm-screw m that portion of the track lettered N can be adjusted vertically, thereby varying the position of the followers in the mold-boxes at the time the clay is fed thereto, and thereby varying the thickness of the brick.

While clay is being fed to the molds the hopper will be agitated by the movement of the mutilated pinion d', acting upon the lever f', and through it and the spring e' giving a reciprocating movement to the rod A', one end of which is pivoted to the hopper.

The bar D'', with the teeth h' upon the end thereof, serves as a locking device to hold the mold-table at rest while the pressure is being given to the brick. This locking device is operated by the rotation of the mutilated gear-wheel B' and the cam C' and roller n'. The latch j' is operated in the same manner and at the same time, being pivoted to B'; but the free end of the latch travels a little faster than its center, so that the hook m' will be brought into position to engage with one of the mold-boxes before the lock has fairly entered the notches i', and this latch will arrest the movement of the mold-table at the proper point, even though its momentum should have a tendency to drive it a little too far.

The pressed brick are removed from the mold-table by the movement of the sweep-box a', which is operated by the devices shown, being the cam r, roller t, bar V, connecting-rod v, bell-crank lever W, and link w. There is a roller at the end of the link w which moves in the slot in the guide c'.

The roller b' in the sweep-box a' is composed of sheepskin or other suitable material, placed upon a shaft and adapted to receive oil for oiling the upper surface of the followers, which is done when the sweep-box is removing brick and returning to its place.

By making the follower-guides G separate and bolting them to the mold-boxes great facility in repairing is secured, because if the guides become worn by the movement of the follower-stems such guides can be readily removed and replaced.

The tubes k'' are a desirable improvement, because by them the space, if any, between the counter-pressure plate F' and the truss D is closed, so that no part of the surplus clay can get in between the said two parts F' D.

The movable portion N of the track always remains in a horizontal position, so that the plungers do not change their positions vertically while the boxes are moving from the hopper to the point where the first pressure is given, and hence the depth of the clay in all parts of the mold-box will be uniform.

If the projection $m'$ on the latch $j'$ should break and the mold-table be carried a little too far, the locking-teeth $h'$ will still engage with some of the notches $i'$ in the mold-box, and no damage will be done to the machinery, although it will be thrown out of time; but it will be easy to stop the machine and remove the broken latch and attach a new one and then readjust the mold-table.

By making the sliding bar which carries the teeth $h'$ in two parts, D" E', the removal of the shaft T is facilitated, because by removing the part E' and a part of the housing N' and some fastenings the shaft T can be readily removed, leaving the part D" in position, which can only be removed with difficulty. The housing N' is made in two parts bolted together, as shown in Fig. 9. As shown, the pitman $g''$ is slotted and the crank-pin is inserted in the block which moves in the slot. In Fig. 6 the longitudinal center of the machine is at $x$ $x$.

The devices for bringing the brick into proper position for removal are such as are in common use.

What I claim as new, and desire to secure by Letters Patent, is—

1. In a brick-machine, a track for the lower ends of the follower-stems provided with a movable piece, N, provided with two or more inclines, $j$, on the under side, in combination with a support, O, provided with two or more inclines, $k$, substantially as and for the purpose specified.

2. In a brick-machine, a track for the lower ends of the follower-stems having a movable part consisting of two pieces, N $i$, and a rack on the part N, in combination with a worm-wheel, $m$, substantially as and for the purposes specified.

3. In a brick-machine, a fulcrum-pin, $i''$, provided with an eccentric, $h''$, for the purpose of varying the position of the fulcrums of the pressure-levers, as may be desired for brick of different thicknesses, substantially as specified.

4. In a brick-machine, the pressure-lever G', forked at its inner end, and the pressure-lever I', having its inner end between the arms of the fork lever G', in combination with a main shaft, R, and a cam, J', provided with rollers $s'$, whereby the single cam J' operates both levers G' I' simultaneously, substantially as and for the purposes specified.

5. In a brick-machine, a mold-table provided with mold-boxes, followers in the mold-boxes, follower stems supported on a track having movable parts $u'$ $a''$ $c''$, and a counter-pressure plate, F', in combination with three pressure-levers, G' H' I', a main shaft, R, cam J', provided with rollers $s'$, crank $f'''$, pitman $g''$, and pressure-blocks K' L' M', substantially as and for the purposes specified.

6. In a brick-machine, a revolving mold-table having mold-boxes thereon provided with notches $i'$, in combination with a mutilated pinion, B', cam C', a sliding and locking bar provided with teeth to engage with the notches $i'$, and a latch, $j'$, pivoted to said sliding and locking bar, substantially as and for the purposes specified.

7. In a brick-machine, a sweep-box, $a'$, in combination with a cam, $r$, sliding bar V, and bell-crank lever W, substantially as and for the purpose specified.

8. In a brick-machine, a main shaft, R, miter-wheels S U, and shaft T, in combination with a cam, $r$, sliding bar V, sweep-box $a'$, and connections between the bar V and box $a'$, substantially as and for the purpose specified.

9. In a brick-machine, a pivoted hopper, in combination with a mutilated pinion, $d'$, lever $f'$, bar A', and spring $e'$, substantially as and for the purposes specified.

10. In a brick-machine, the combination of a bed-plate, A, posts B, trusses C D D', hood L, pivot J, for the hub of the mold-table, supports K, for the pivot J, and bolt M, substantially as and for the purposes specified.

WILLIAM L. GREGG.

Witnesses:
J. R. MASSEY,
WM. V. MASSEY.